Figure 1:
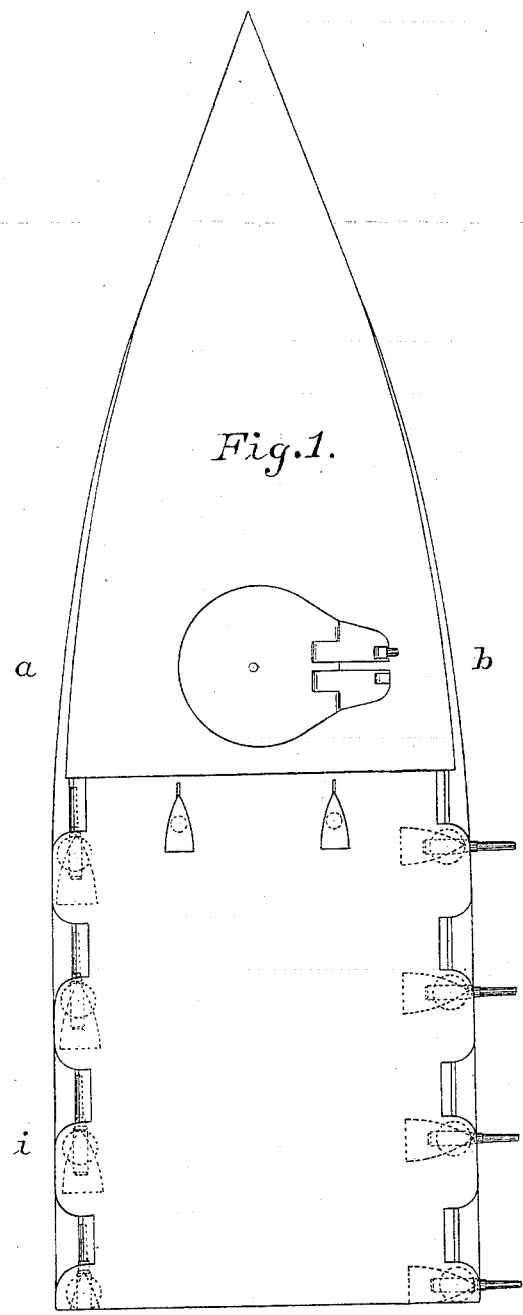

(No Model.) 9 Sheets—Sheet 1.
N. B. CLARK.
DEFLECTING ARMOR FOR WAR SHIPS.
No. 282,498. Patented Aug. 7, 1883.

WITNESSES
Otto C. Gantner
H. G. Leopold

INVENTOR
Nathan B. Clark

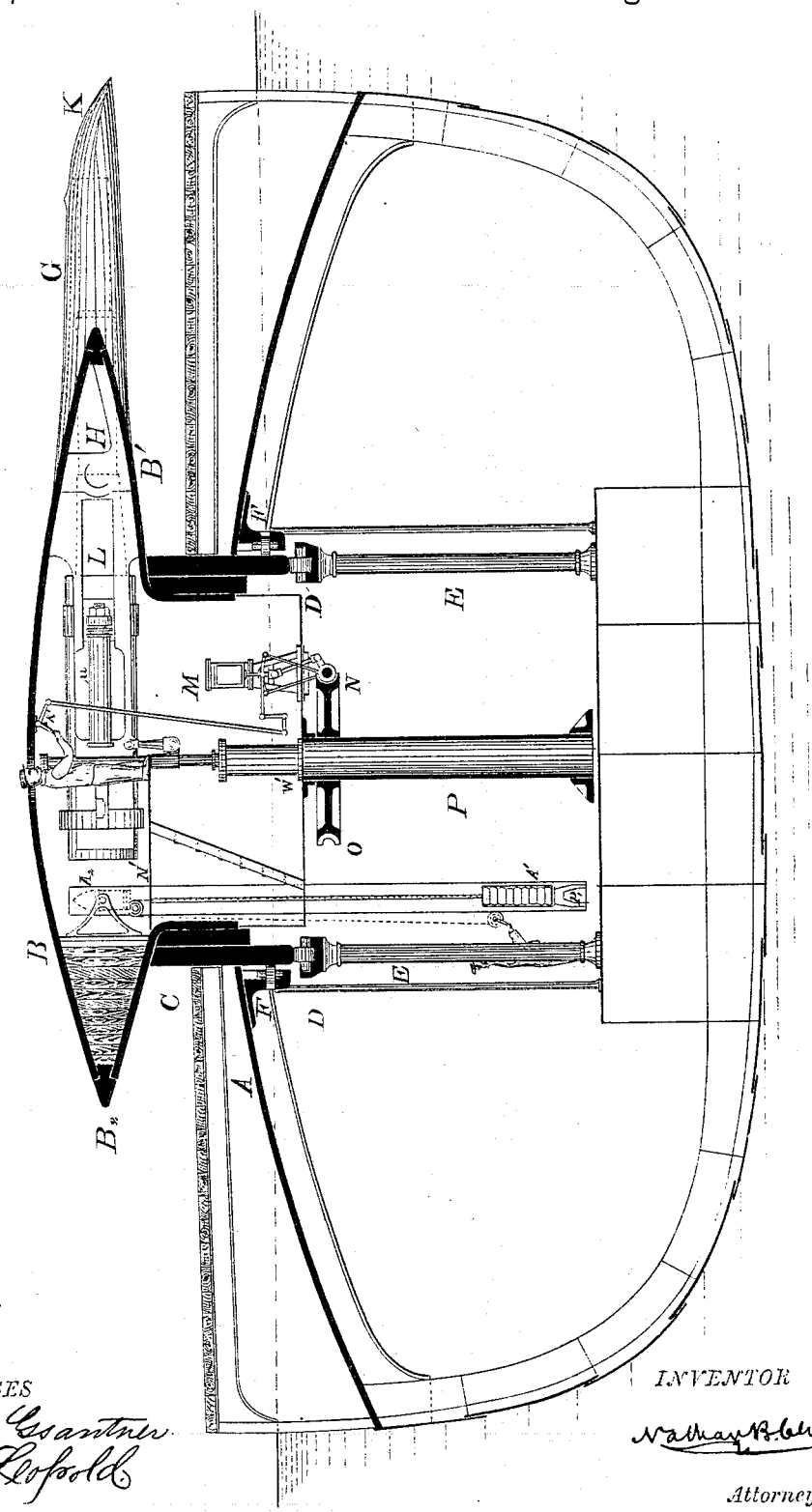
(No Model.) 9 Sheets—Sheet 2.
N. B. CLARK.
DEFLECTING ARMOR FOR WAR SHIPS.
No. 282,498. Patented Aug. 7, 1883.

(No Model.) 9 Sheets—Sheet 3.
N. B. CLARK.
DEFLECTING ARMOR FOR WAR SHIPS.
No. 282,498. Patented Aug. 7, 1883.
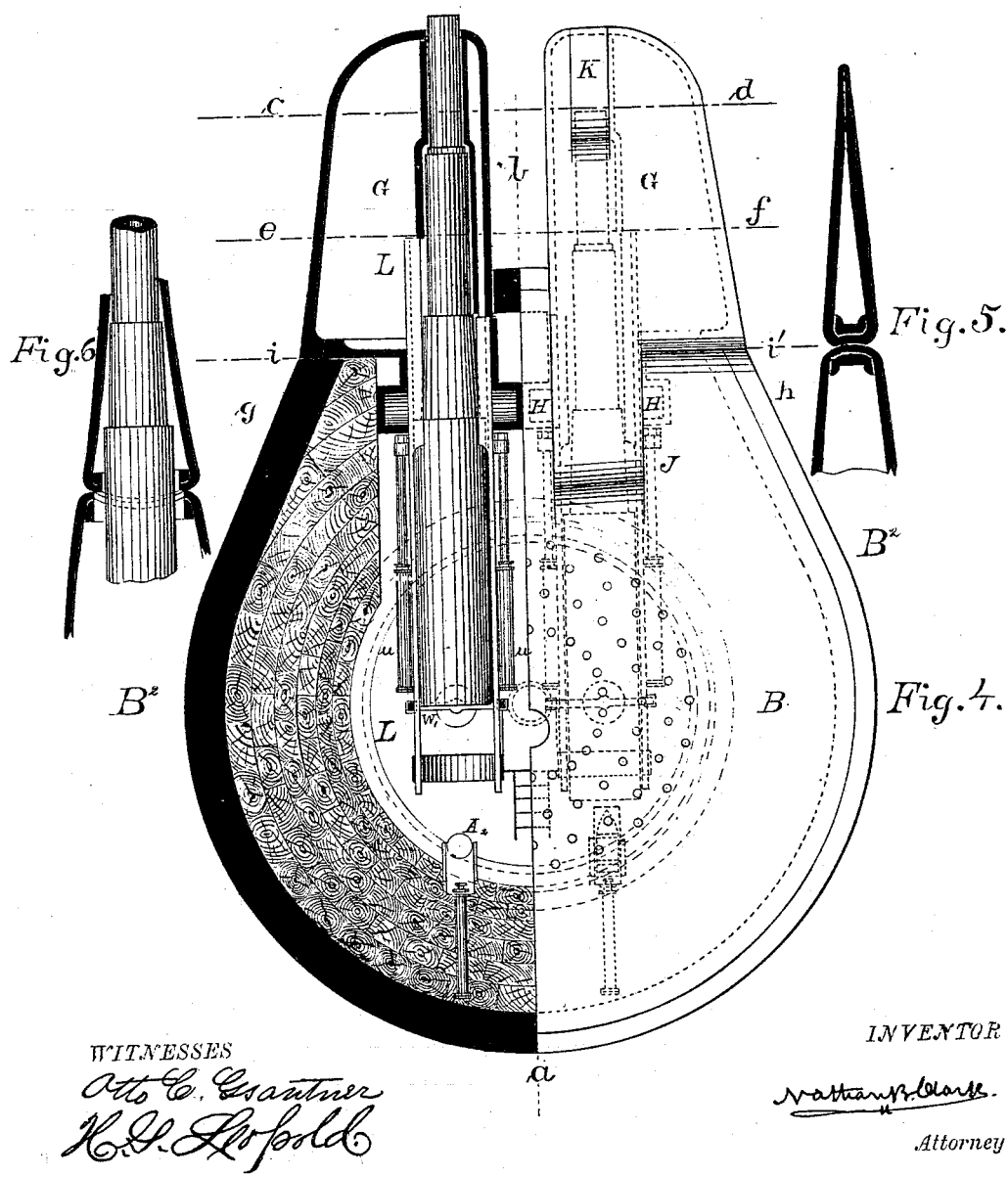

(No Model.) 9 Sheets—Sheet 4.
N. B. CLARK.
DEFLECTING ARMOR FOR WAR SHIPS.
No. 282,498. Patented Aug. 7, 1883.

WITNESSES
INVENTOR
Attorney (No Model.) 9 Sheets—Sheet 5.

N. B. CLARK.
DEFLECTING ARMOR FOR WAR SHIPS.

No. 282,498. Patented Aug. 7, 1883.

WITNESSES
INVENTOR
Attorney (No Model.) 9 Sheets—Sheet 6.
N. B. CLARK.
DEFLECTING ARMOR FOR WAR SHIPS.
No. 282,498. Patented Aug. 7, 1883.
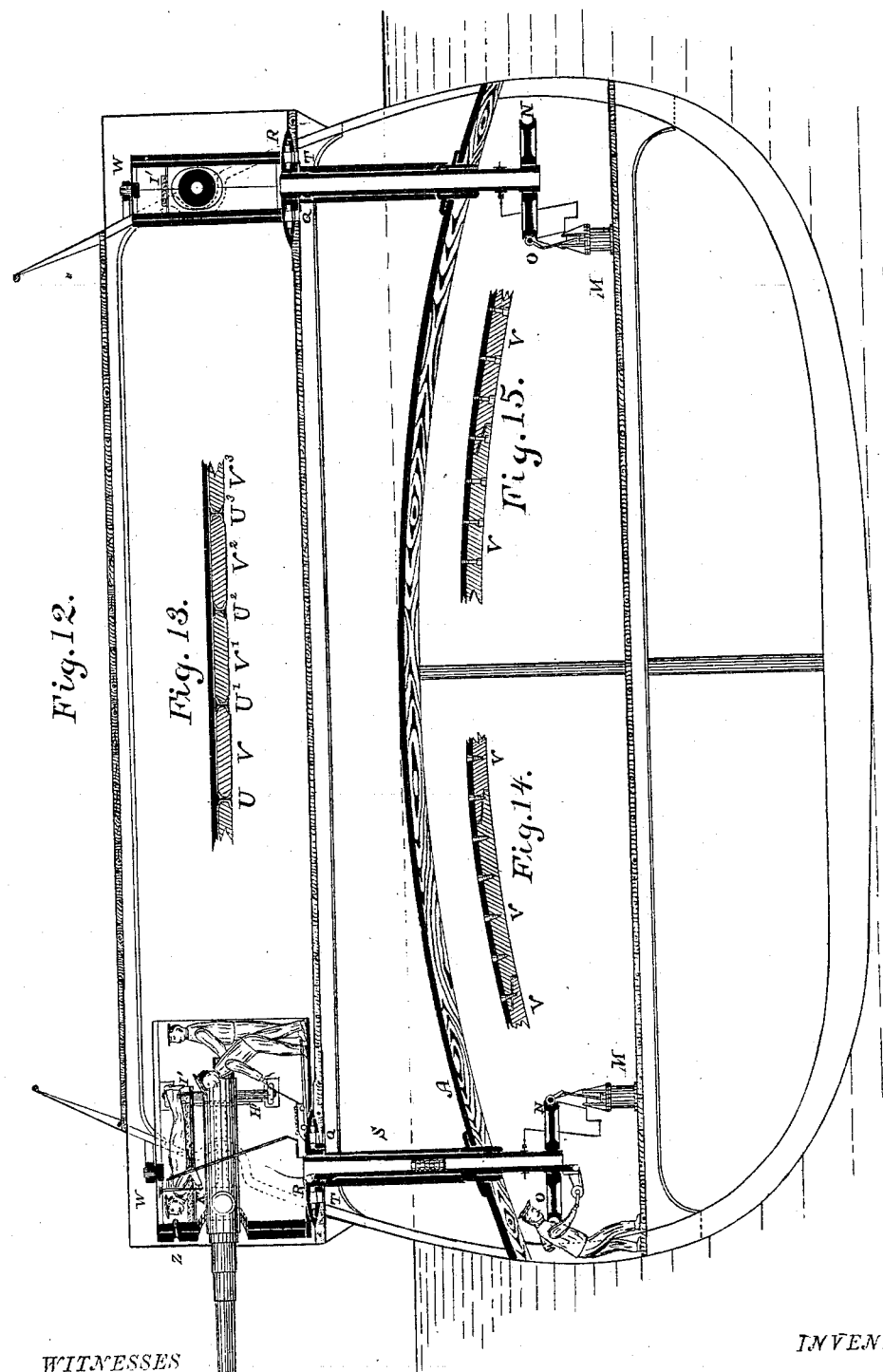
WITNESSES
INVENTOR
Attorney (No Model.) 9 Sheets—Sheet 7.
N. B. CLARK.
DEFLECTING ARMOR FOR WAR SHIPS.
No. 282,498. Patented Aug. 7, 1883.
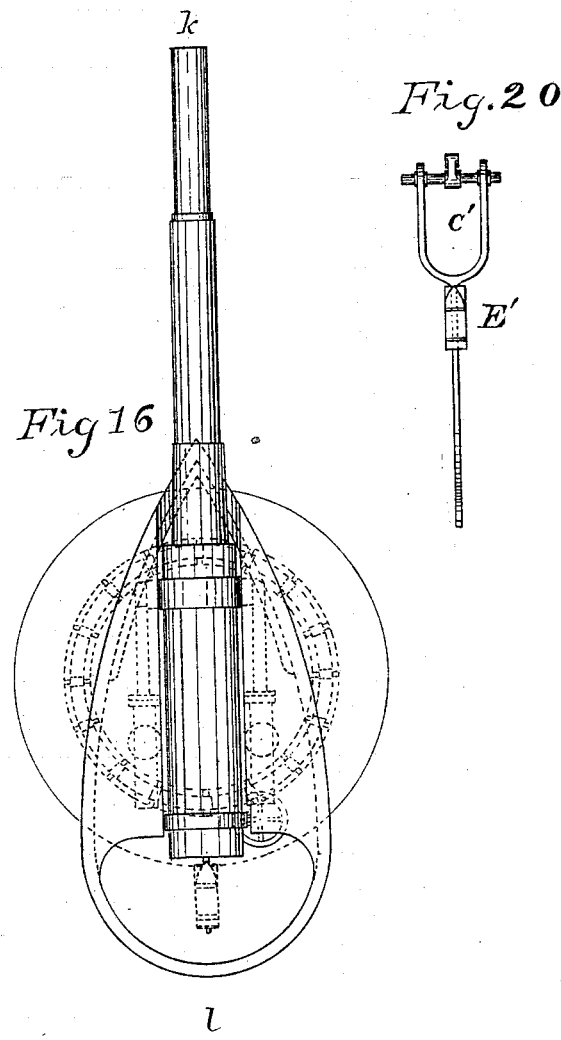
WITNESSES
Otto C. Gsantner
H. G. Leopold
INVENTOR
Nathan B. Clark.

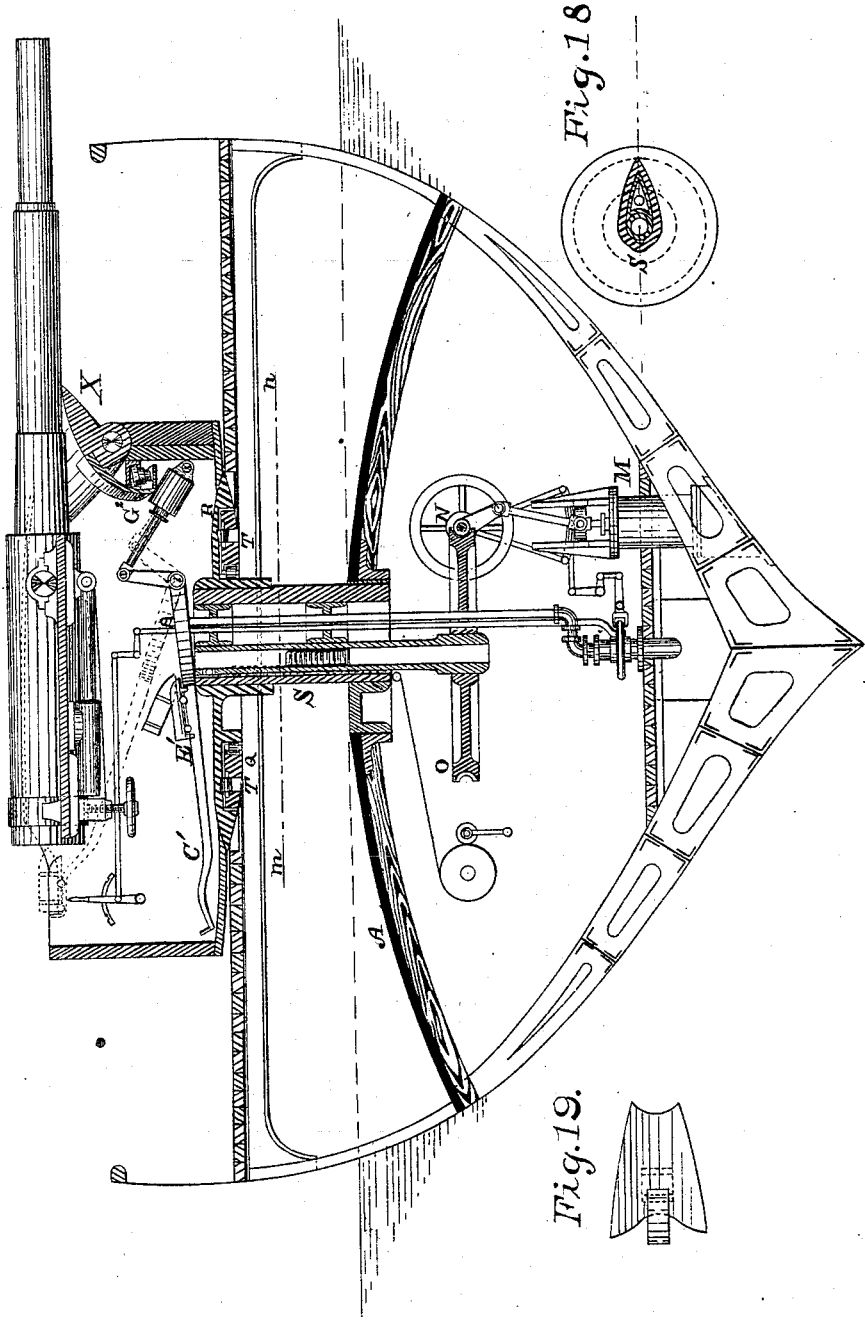

(No Model.) 9 Sheets—Sheet 9.

N. B. CLARK.
DEFLECTING ARMOR FOR WAR SHIPS.

No. 282,498. Patented Aug. 7, 1883.

WITNESSES

INVENTOR

UNITED STATES PATENT OFFICE.

NATHAN B. CLARK, OF PHILADELPHIA, PENNSYLVANIA.

DEFLECTING-ARMOR FOR WAR-SHIPS.

SPECIFICATION forming part of Letters Patent No. 282,498, dated August 7, 1883.

Application filed March 5, 1883. (No model.)

*To all whom it may concern:*

Be it known that I, NATHAN B. CLARK, a citizen of the United States, residing at Germantown, in the county of Philadelphia and State of Pennsylvania, have invented certain new and useful Improvements in Deflecting-Armor for War-Ships; and I do declare the following specification to be a full, clear, and exact description of the invention, such as will enable others skilled in the art to which it appertains to make and use the same, reference being had to the accompanying drawings, and to the figures and letters of reference, forming a part of this specification.

My invention relates to that form of armor which protects by the deflection of projectiles rather than by direct resistance, the surface of the armor being disposed so as to present a very acute angle to the course of the shot; and it consists of details of construction, as hereinafter pointed out and claimed, the same being generally intended for use with such a vessel as is described in my Patent No. 231,899, of September 7, 1880; but when the present improvements are capable of use with vessels of other construction, or with land fortifications, I propose they shall be so used.

A patent for an armor-clad ship, comprising a deflecting-turret, No. 255,144, was granted me on March 21, 1882, the turret, consisting of an upper and lower deflecting-plate secured together at their outer circumference and forming a turret of double-convex shape, deflecting shot upwardly and downwardly, the deflecting-plates, protecting the guns and men to work them, being supported above the deflecting-shield protecting the water-line on a vertical central column. This turret deflects shot coming from all directions.

A patent was also granted me for shields for ships' guns, No. 256,124, of April 11, 1882, the shields being V-shaped, the deflecting-surfaces being disposed vertically and deflecting shot sidewise. The shields are trained with the guns mounted in them, and are only intended to deflect shot coming from the direction in which the guns are trained.

The object of my present invention is to produce improved deflecting turrets and shields; also, improved devices for operating turrets and shields; also, improved deflecting turn-tables, on which guns are mounted in shields; also, improved gun slides or carriages connected with deflecting turrets or shields; also, shields or covers for guns.

Figure 2:
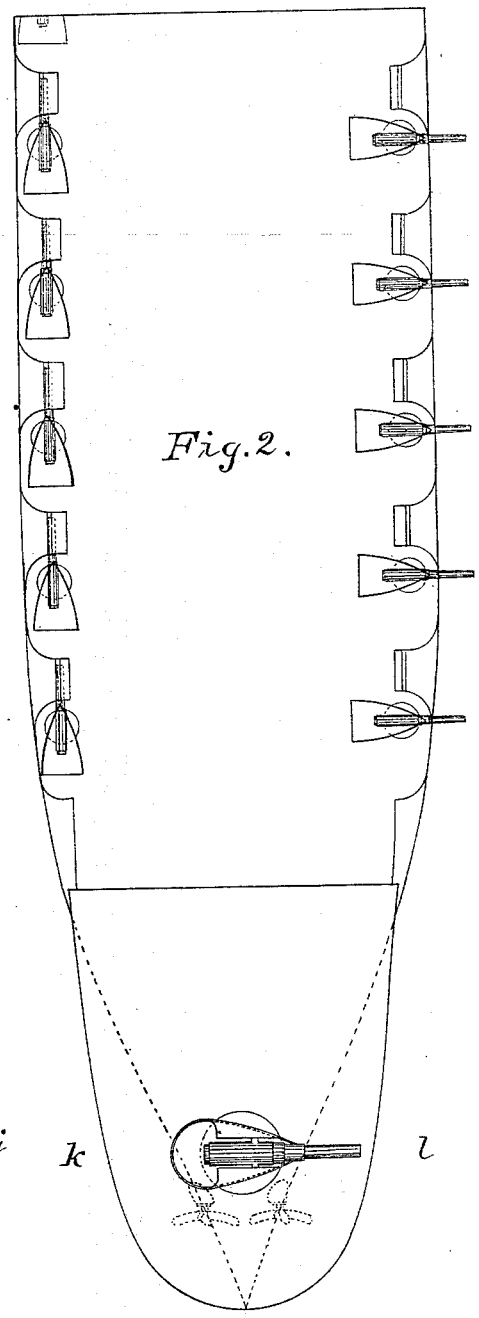
Figure 10:
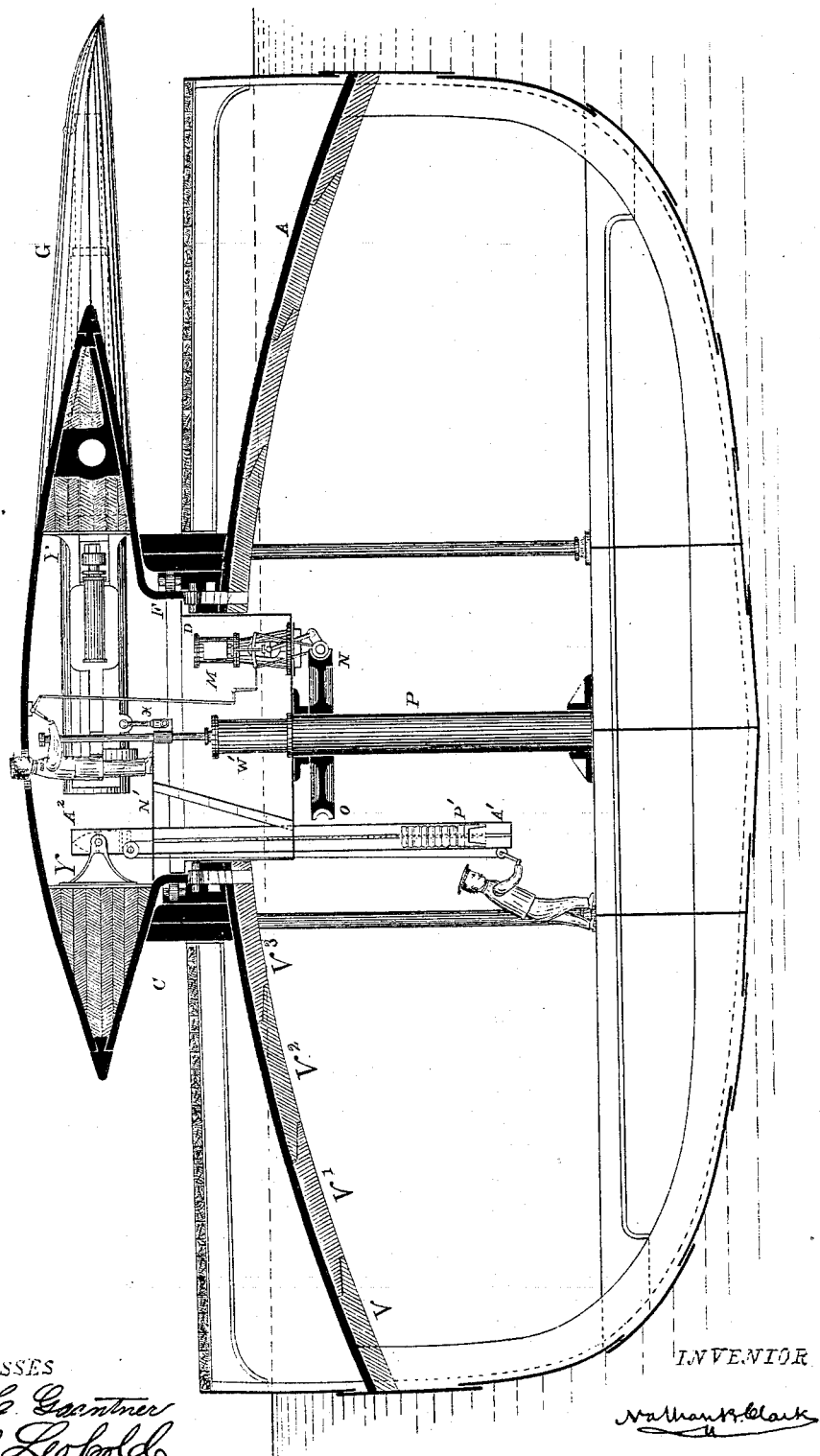
Figure 11:
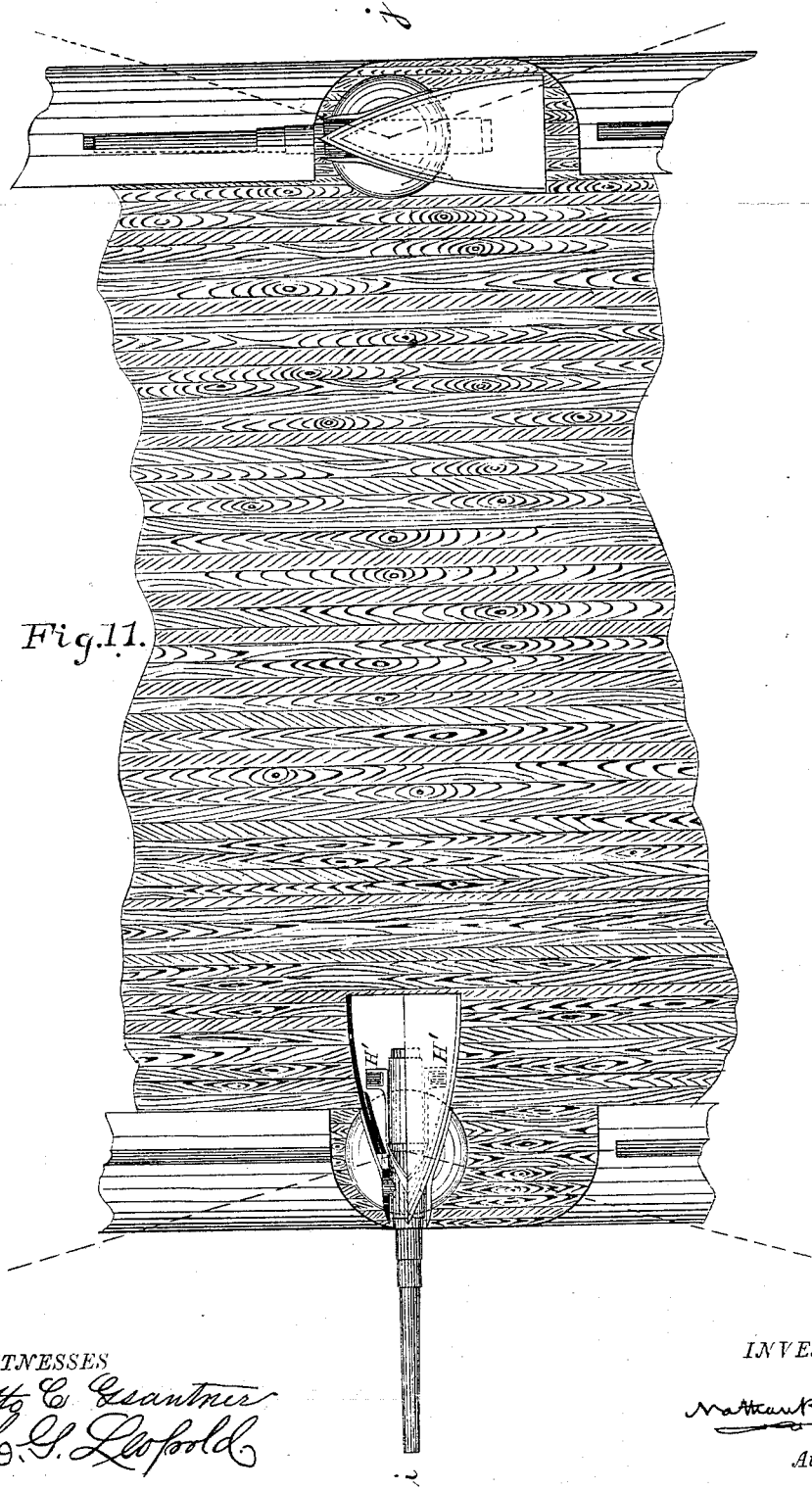
Figure 21:
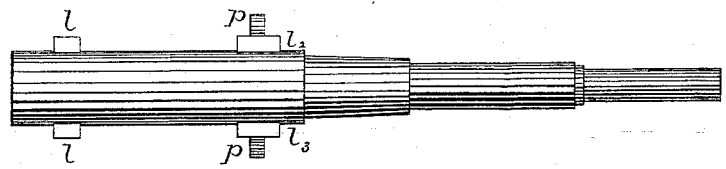
Figure 22:
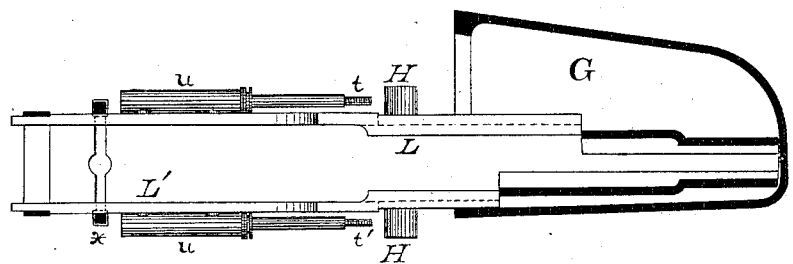
Figure 23:
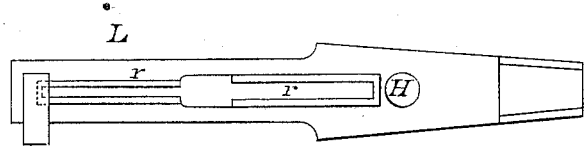

In the drawings forming a part of this specification, Figures 1 and 2 represent the deck plan of a vessel, shown in two sections for convenience of illustration, giving the outline of a deflecting-turret on the forward part, eighteen broadside-guns in V-shields along the amidship section, one large pivot-gun mounted *en barbette* on a V-shield at the stern, and two machine-guns in V-shields on the hurricane-deck. Fig. 3 represents a cross-section of the vessel on the line $a\ b$ of the plan view, Fig. 1, through the center of the deflecting-turret. Fig. 4 is a plan view, on an enlarged scale, of the improved deflecting-turret. Figs. 5 and 6 are sectional views through the joints of the deflecting-turret, the joints being the junctions between the gun-sheaths and the shell of the deflecting-turret. Fig. 7 illustrates a cross-section through the guns and deflecting gun-sheaths on the line $c\ d$. Fig. 8 illustrates a cross-section of the same on the line $e\ f$. Fig. 9 illustrates a cross-section through the deflecting-turret, and guns on the line $g\ h$, through the trunnions. Fig. 10 illustrates a cross-section of the vessel through the center of the deflecting-turret, and is similar to Fig. 3, except in some matters of minor detail. Fig. 11 illustrates a plan view of two guns of the broadside-battery on opposite sides of the vessel, the same being on an enlarged scale. Fig. 12 shows a cross-section of the vessel, through the center of two of the V-shields of the broadside-battery on the line $i\ j$. Fig. 13 represents a longitudinal section of the deflecting-shield A, for the defense of the water-line, showing the method of applying compressed-paper backing in combination with the I-beams supporting the shield. Figs. 14 and 15 show the method of securing compressed-paper backing to the deflecting-shield A by means of screws. Fig. 16 illustrates a plan view, on an enlarged scale, of the pivot-gun mounted *en barbette* on a V-shield at the stern of the vessel. Fig. 17 represents a cross-section of the vessel on the line $k\ l$, Fig. 2, and of the enlarged plan of the shield, Fig. 16, on the line $k\ l$, showing the vessel and shield in section and the gun in elevation. Fig. 18 is a cross-section of the rotating and conduit pipe S on the line m n, Fig. 17. Fig. 19 is a plan view of an improved port-stopper for closing the aperture between the gun and V-shield when the gun is elevated. Fig. 20 is a plan view of a lever for elevating ammunition to the breech of the pivot-gun, as shown by C', Fig. 17. Fig. 21 is a plan view of a gun, showing the lugs $l\,l$, upon which it slides in its frame. Fig. 22 is a plan view of the gun-frame L with the lower plate of the deflecting gun-sheath G attached to it. Fig. 23 is a side elevation of the gun-frame L.

In my former patent the upper and lower plates, B B', of the deflecting-turret were supported above the deflecting-shield A on a central cylindrical column, which was solid excepting an aperture which served as a conduit for the admission of the water by which the hydraulic presses of the guns were operated. In later drawings, made after my application for a patent but before it was granted, the opening through the central supporting-column was made sufficiently large to admit of the passage of men and ammunition through it to the turret above; and now in the improved deflecting-turret the opening through the central supporting-cylinder, C, is made sufficiently large to contain the men engaged in loading the guns.

In my former patent the muzzle ends of the guns were protected against cross-fire by means of deflectures firmly secured to the guns. In the improved deflecting-turret the guns move back and forth freely in their deflecting-sheaths, which are provided at their ends with hinged gates, by which all small projectiles are shut out of the guns.

Referring to the drawings, Fig. 3 is a cross-section of the vessel on the line $a\,b$, Fig. 4, through the center of the improved deflecting-turret. A is the deflecting-shield for the defense of the water-line; B, the upper deflecting-plate; B', the lower deflecting-plate. $B^2$ is an outer ring of V-shaped cross-section, by which the upper and lower deflecting-plates of the turret are joined together. C is the central cylindrical column forming the lower part of the deflecting-turret, and upon which the upper part is supported. The central column, C, rests on the anti-friction rollers D D', supported on the heads of the vertical column E E', which in turn rest upon a number of longitudinal keelsons at their base, thereby distributing the weight of the turret over the bottom of the vessel. The deflecting-turret is supported laterally by means of the anti-friction rollers F F', protected beneath the deflecting-shield A. The deflecting-turret is rotated and the guns trained by means of a pair of pneumatic or steam engines, M, secured to the floor of the turret. These engines turn a shaft upon which there is a worm-screw, N, which engages in a stationary circular rack, O, at the top of the column P, rising from the bottom of the vessel. These rotating-engines M are provided with a Stephenson's link-motion or other suitable device for controlling the valves, by which the officer in command of the turret, standing on the small platform between the guns, looking out of the central aperture, can train the guns on any object within view with great celerity and precision, the screw N on the shaft of the engines holding the turret firmly in any desired position. The power for working the rotating-engines M, as well as that for operating the hydraulic presses of the guns, is to be conveyed into the turret through the central hollow column, P, in pipes provided with slip-joints.

Fig. 10 is a cross-section of the improved deflecting-turret similar to Fig. 3, except that the supporting cylindrical column C is stationary, being secured to the deflecting-shield A, protecting the water-line. The upper part of the turret, comprising the upper deflecting-plate, B, the lower deflecting-plate B', the connecting-ring $B^2$, together with the interior casing of the turret and its contents, including the guns, revolve as in the turret heretofore described, the anti-friction rollers D and F being protected within the cylindrical column C instead of beneath the deflecting-shield A, as in Fig. 3.

Referring to the plan view, Fig. 4, of the improved deflecting-turret and the cross-sections through the same, Figs. 3 and 10, letter G represents the deflecting gun-sheaths, extending over the case or muzzle ends of the guns, and protecting them from cross-fire. These gun-sheaths consist of an upper and a lower deflecting-plate, and may be constructed of the same material as the shell of the turret B B'. The enlarged plan view of the turret, Fig. 4, shows one-half of the upper deflecting-plate, B, removed, as well as the upper plate of the gun-sheath G on the port side, thereby giving a view of the gun and the interior of half of the turret on that side.

Instead of trunnions, each gun is provided with four lugs, $l\,l'\,l^2\,l^3$, and each gun is mounted between two frames, L L, Figs. 22 and 23. These frames have slots $r\,r$, into which the lugs on the gun fit, and upon which the guns slide back and forth for recoil and during exercise at quarters. Upon each gun-frame and forming a part of the same is the trunnion H, Figs. 22 and 23. The gun-frames L L' and the upper and lower plates of the gun-sheaths G are securely attached together, and when the gun is elevated or depressed the gun, the gun-frame L, and the gun-sheath G move as one piece, the axis of oscillation being the trunnions H H.

Referring to the plan view of the deflecting-turret, Fig. 4, it will be seen that the gun-sheaths G, oscillating on the trunnions H, form joints with the turret-armor on the line $i\,i$ and at J. The gun is by this means extended through the armor without any port-hole through which missiles could enter.

Fig. 22 shows a pair of gun-frames, L L, attached to the lower deflecting-plate, G, of a gun-sheath. This figure also shows the hydraulic presses u u, upon which the recoil of the gun is received, and by which it is run out to fire and out and in while exercising at quarters. t t are the plungers of the hydraulic cylinders, which are inserted in the eyes p p on the forward lugs of the gun when it is mounted in its frame L, which is its slide.

Figs. 5 and 6 represent sections of the improved deflecting-turret through the joints i i and J. Fig. 7 shows a cross-section through the guns and gun-sheaths G on the line c d. Fig. 8 shows a cross-section of the same on the line e f. Fig. 9 shows a cross-section through the improved deflecting-turret on the line g h, representing a cross-section of the guns and gun-frames L at the trunnion-center H. The upper and lower plates of the deflecting gun-sheaths G are braced apart by the gun frames or slides L, and, besides, have additional braces, as shown by the cross-sections, Figs. 7, 8, and 9. These will prevent the deflecting-plates of the gun-sheaths from being driven down by the impact of projectiles impinging against them, and thereby pinching the guns fast. The guns, however, are given a due amount of clearance, so that such an accident would not be apt to happen.

Of course it is understood that this turret is designed to resist horizontal fire, and to such fire it presents acute-angled deflecting-surfaces to shot coming from all directions. All the surfaces are curved ones as curved surfaces are much better adapted to deflect shot than plane ones. With acute-angled convex surfaces the shot is eased away from the surface of the armor by the angle becoming less as the shot slides along it.

The gun-sheaths G are principally intended to protect the guns from cross-fire. At the end of each gun-sheath is a hinged gate, K, of the width of the muzzle end of the gun. When the gun is run in to reload, this gate is closed; but when the gun is run out to fire the muzzle end of the gun pushes the gate open, and it rests on top the gun. When the gun is fired, it recoils within the sheath, and the hinged gate closes automatically at the moment of recoil, thereby protecting the muzzle end of the gun and preventing the entrance of small missiles into it, which otherwise might enter the muzzle. I deem this important at the present time on account of the extraordinary development of machine-gun fire.

Small shell made of hard steel or chilled cast-iron and fired from machine-guns into the muzzle of a large gun, would, if permitted to remain until the gun was fired, be very liable to destroy any ordinary built-up gun, as the shot would wedge up against the hard, sharp fragments, and would at least ruin the interior of the gun, if it did no more serious damage by exploding the gun and killing the men in the turret. Besides, small shell might be fired into the muzzle of a gun, thereby exploding the powder charge while the gun was being loaded and killing the gunners.

The ammunition for the guns in the deflecting-turret is elevated from below, as shown in Figs. 3 and 10, by means of the elevating device there illustrated. This consists of the pipe A', through which the ammunition is elevated, and the traveler P', upon which the ammunition is placed, and which is run up and down the pipe A' by means of a wire rope wound around a drum, which is turned by a man by means of a crank, as shown. Directly above the pipe A' is a short section of pipe, $A^2$, of the same size. This pipe, $A^2$, is swung on trunnions, as shown, so that it may be turned over into a horizontal position, so that the central axis of the pipe would be on a line with the center of the bore of the gun. The tilting pipe $A^2$ is also provided with spring-catches by which the ammunition may be caught and retained after being pushed up through the elevating-pipe A' by the traveler P'. The tilting pipe A' is then turned over to the horizontal position immediately back of the gun, and the ammunition pushed into it by the hydraulic rammer shown in the plan view, Fig. 4.

Figs. 3 and 10 show a projectile caught by the spring-catches in the tilting pipe A', which is still in the vertical position, and a powder-cartridge is being pushed up the elevating-pipe A' by the traveler P'.

The guns in the deflecting-turret are elevated and depressed by means of the hydraulic cylinders W', one being placed immediately under each gun, and each hydraulic cylinder being provided with a cross-head, the ends of which embrace stout stanchions, which serve as guides, there being four such stanchions, one being on each side of each gun, as shown. Ample room is allowed in the turret-chamber under the guns for the men engaged in loading them.

In the drawings, which are made to scale, the turret-chamber is fourteen feet in diameter, and the distance from the under side of the guns to the floor of the turret is six and a half feet, which was considered a convenient height.

In operating the battery the officer in command of the turret stands on the platform N' between the guns and looks out of the central aperture through the top of the turret, from which he has a clear view all around, and, by means of a lever convenient to hand, controlling the valve-gear of the rotating-engines, he can train the guns on any object. By means of a similar lever admitting water to the hydraulic elevating-presses he can elevate or depress the guns, as desired, the valves being so arranged that motion of the lever in one direction will elevate the guns and in the other direction will depress them. By another similar lever the guns can be run out or in.

The outer portion of the interior of the deflecting-turret is to be braced in the manner best calculated to assist in the deflection of projectiles. Figs. 3 and 4 show the outer portion of the interior of the turret solidly filled with wood. The filling of the same space, Y Y, Fig. 10, is intended to represent compressed paper, which has the advantage over wood that it is not liable to produce splinters when struck by shot. In each case the deflecting-turret is to be fitted with a cylindrical casing, to prevent the entrance of splinters, &c., into the interior space.

It is proposed to construct the shell of the deflecting-turret and gun-sheaths preferably of steel containing a sufficient amount of carbon to give it due hardness, which is deemed requisite for an efficient deflecting-surface; but experiment can alone determine what material will give the best results. As shot always move in the direction of the least resistance, and as even so unstable a substance as water will deflect them, as is shown by the ricochet shot, it is not unreasonable to suppose that in an emergency a fair result might be obtained from a deflecting-turret constructed entirely of wood or of compressed paper without any exterior metallic casing, but with a light sheet-metal interior cylinder.

In constructing the shell of the deflecting-turret and gun-sheaths it is proposed to bend the plates to the desired curvature, while hot, by the aid of appropriate forms under a hydraulic press.

Fig. 11 represents a plan view of a section of the vessel on each side of the line $i\,j$, Fig. 1, a single gun of the broadside-battery being shown on each side of the ship. Fig. 12 represents a cross-section of the vessel on the line $i\,j$, Fig. 11.

The guns and shields on one side of the ship are arranged in a line with the side of the vessel in the position in which they will be secured when the ship is under way at sea. On the other side the guns are represented as cast loose for action, being at right angles to the side of the vessel.

In Fig. 12 the ship is represented as prepared for action, with the crown of the deflecting-shield A submerged to the water-line. This is done by admitting water to the cellular bottom. The normal position of the deflecting-shield A is with its crown somewhat above the water-line.

The guns of the broadside-battery illustrated by Figs. 11 and 12 are mounted in V-shields open at the rear, and are intended to be kept trained, so as to present very acute angles to shot coming from the direction in which the guns are pointed. The deflecting-surfaces of the V-shields are disposed vertically, and are intended to deflect shot sidewise. The vertical V-shields are in reality stationary gun-carriages, as well as forms of armor.

A patent has already been granted me on a V-shield consisting of two curved plates secured together at one end, presenting curved surfaces disposed vertically, so as to deflect shot sidewise, with a gun mounted either *en barbette* or through the junction of the two plates of armor, the gun being so mounted on trunnions or otherwise as to admit of elevation or depression, but having no lateral motion independent of the shield. When the gun is trained to deliver its fire, the shield is trained to receive and deflect shot coming from the same direction.

One of the principal improvements in the vertical V-shields is the deflecting turn-table upon which the shield rests. The office of the deflecting turn-table is to protect between its deflecting-surfaces the anti-friction rollers T. This deflecting turn-table is shaped like a double-convex lens, and is divided into two parts by a horizontal and a vertical line, the lower part, Q, being secured to the deck of the vessel and having the anti-friction rollers secured in it in fixed bearings, the plate being cut away immediately beneath the central part of the rollers, in order to prevent an accumulation of sand or dirt, which might otherwise clog them. The fixed lower plate, Q, has an opening in the center, through which passes the rotating pipe S, which is secured to the upper plate, R. This upper plate, R, rests on the anti-friction rollers T, fixed in the lower plate, Q. The upper plate, R, besides being attached to the rotating pipe S, is also attached to the shield in which the gun is mounted, forming a part of the bottom of the shield.

The vessel upon which the broadside-battery is shown has some four feet of tumble home—that is, the sides of the vessel incline inward four feet from the vertical between the water-line and the line of the spar-deck. The V-shields of the broadside-battery are mounted in bay-window-like projections extending beyond the side of the vessel at the line of the gun-deck, but not beyond the side of the vessel at the water-line. The broadside V-shields are swung on two pivots, one being the pipe S through the lower plate, Q, of the deflecting turn-table, and the other the I-beam of the spar-deck at W.

When the guns of the broadside-battery are secured for sea, they are trained fore and aft on a line with the ship's sides, the guns being half-way embedded therein, as shown in Figs. 1, 2, and 11. The V-shields and guns of the broadside-battery are trained from below by means of the pipe S, Fig. 12, which has a gear-wheel, O, at its lower end, in which the worm-screw N on the shaft of the rotating-engines M engages, thereby training the gun and shield in any position desired. The recoil of the guns is shown as received on the strap-springs H; but any other form of spring may be applied, or the recoil may be received on hydraulic presses, as shown, in the deflecting-turrets.

The ammunition is elevated to the gun through the training-pipe S, the same being provided with apparatus similar to the deflecting-turrets, the ammunition being pushed up the pipe and falling over into a small truck or trolley under the gun, from whence it is drawn out by means of a lanyard by one of the gunners engaged in loading the gun at the breech.

Immediately over the gun in each shield of the broadside-battery is a small cushioned platform, I', supported on springs, on which the captain of the gun reclines in a prone position, and trains, sights, and fires it, taking aim through the aperture Z, and training the gun by means of the lever K', controlling the link-motion of the training-engines M, which is convenient to hand, and a connecting-rod from which extends down the pipe S to the engines, thereby enabling him to train his gun on any object without the intervention of any other person.

By this method of mounting guns in V-shields three men can work a six-inch rifle, throwing a projectile of one hundred pounds weight, and these men will be completely protected within the armor of the shield, which also constitutes a carriage for the gun. This is a desideratum well worthy of consideration in these days of rapid machine-gun fire, when it will be simple folly to expose men on the open deck.

It will also be observed that by this arrangement of the broadside-battery the guns are given a very wide range of fire, as is shown by the dotted lines of the plan view, Fig. 11.

Fig. 13 is a longitudinal section of the deflecting-shield A for the defense of the water-line, showing the method of applying sections of compressed-paper backing $v\ v'\ v^2\ v^3$, in combination with the arched I-beams U U' U² U³, upon which the shield is supported. As will be seen the sections of compressed paper are inserted between the upper and lower members of the I-beams. Figs. 14 and 15 represent cross-sections of portions of the deflecting-shield A, and show the method of securing sections of compressed-paper backing to the deflecting-shield by means of screws.

Fig. 17 represents a cross-section, on an enlarged scale, of the vessel on the line $k\ l$, Fig. 2, the section being taken through the center of the V-shield, upon which is mounted the large pivot-gun at the stern of the vessel, showing the shield in section and the gun in elevation. Fig. 16 is a plan view of the same shield and gun. The cross-section, Fig. 17, being taken near the end of the vessel, the deflecting-shield A is shown with its crown even with the water-line. If the shield A were raised above the water-line at this narrow portion of the vessel, it would be at the expense of the acute angle necessary to deflect shot. The shield and gun illustrated by Figs. 16 and 17, are mounted on a deflecting turn-table similar to the broadside-battery, Figs. 11 and 12, the shield and gun being rotated by the pipe S, which also serves as a conduit for ammunition to the gun.

Fig. 18 represents a cross-section of rotating or training and conduit pipe S on the line $m\ n$.

It will be seen by Fig. 18 that the pipe S presents acute deflecting angles to shot coming from the direction in which the gun is trained. The training and conduit pipes S of the broadside-battery shields present angles similar to Fig. 18.

Referring to Fig. 17, C' represents a lever by which the ammunition is elevated to the breech of the large pivot-gun mounted in the V-shield. The ammunition is pushed up the conduit-pipe S and falls over into the little truck or trolley which traverses the lever C', the truck is drawn out by one of the gunners by means of a lanyard, and is then elevated with the shot or powder charge upon it by means of the hydraulic press G² to the position shown by the dotted lines immediately behind the gun, the hydraulic press G² being connected to the short arm of the lever.

Fig. 20 represents a plan view of the lever C', Fig. 17. The port-stopper X is actuated by a spring, as shown, or by a counter-weight.

What I claim as new, and wish to secure by this patent, is as follows:

1. The deflecting-turret described and shown in Figs. 3, 4, and 10, consisting of an upper deflecting-plate, B, a lower deflecting-plate, B', and an outer ring, B², of V-shaped cross-section, the whole being supported on a vertical column, C.

2. The combination, with a turret or armored structure, of a tubular muzzle-sheath for guns, hinged to the armored turret, so as to form a tight joint therewith, substantially as set forth.

3. The combination, with a turret or shield of double-convex form, of a muzzle-shield for guns, of double-convex cross-section, pivoted to the shield to form a tight joint therewith, substantially as set forth.

4. In combination with a pivoted shield for guns, a base-plate of double-convex cross-section, which supports said shield.

5. In combination with a gun-shield, a base-plate double-convex in cross-section, and having recesses, as described, in which the anti-friction rollers are located.

6. In combination with a pivoted gun-support, a loading-tube of lenticular form, adapted to present its edge in the direction in which the gun is trained, substantially as stated.

7. In a ship, the combination, with the I-beams forming portions of the framing of the vessel, of blocks of compressed paper placed between and held in place by the I-beams, as shown.

8. The gun-sheaths projecting outside the turret, combined with and attached to the gun-slides, which are inside the turret, as stated.

9. The gun-sheaths of the form shown, projecting from the turret, combined with the gun-slides, extending inside the sheaths and forming braces for the same, as set forth.

10. The combination, with a turret or shield, of a deflecting port-stopper, as X, pivoted to the shield, notched to embrace the lower portion of the gun, and counterweighted to close the port below the gun, as stated.

11. In combination with a turret or loading platform, a loading tube or conveyer, having means as described for lifting ammunition, and having the upper end pivoted so as to swing over into line with the bore of the gun, as set forth.

12. The combination, with a turret or shield, of a hydraulic or other operating device, a pivoted lever operated thereby, and an ammunition-truck adapted to roll or slide along said lever and to be lifted thereby, as set forth.

13. The double-convex deflecting-turret, having the edge filled in with compressed paper, wood, or similar material, as set forth.

14. The combination of the cushioned platform with a V-shield, the same being placed over the gun, as shown and described.

15. The combination, with a deflecting gun-sheath, of a deflecting-gate to close the port-hole, substantially as stated.

In testimony whereof I have affixed my signature in presence of two witnesses.

NATHAN B. CLARK.

Witnesses:
OTTO C. GSANTNER,
H. G. LEOPOLD.